Figure 1:
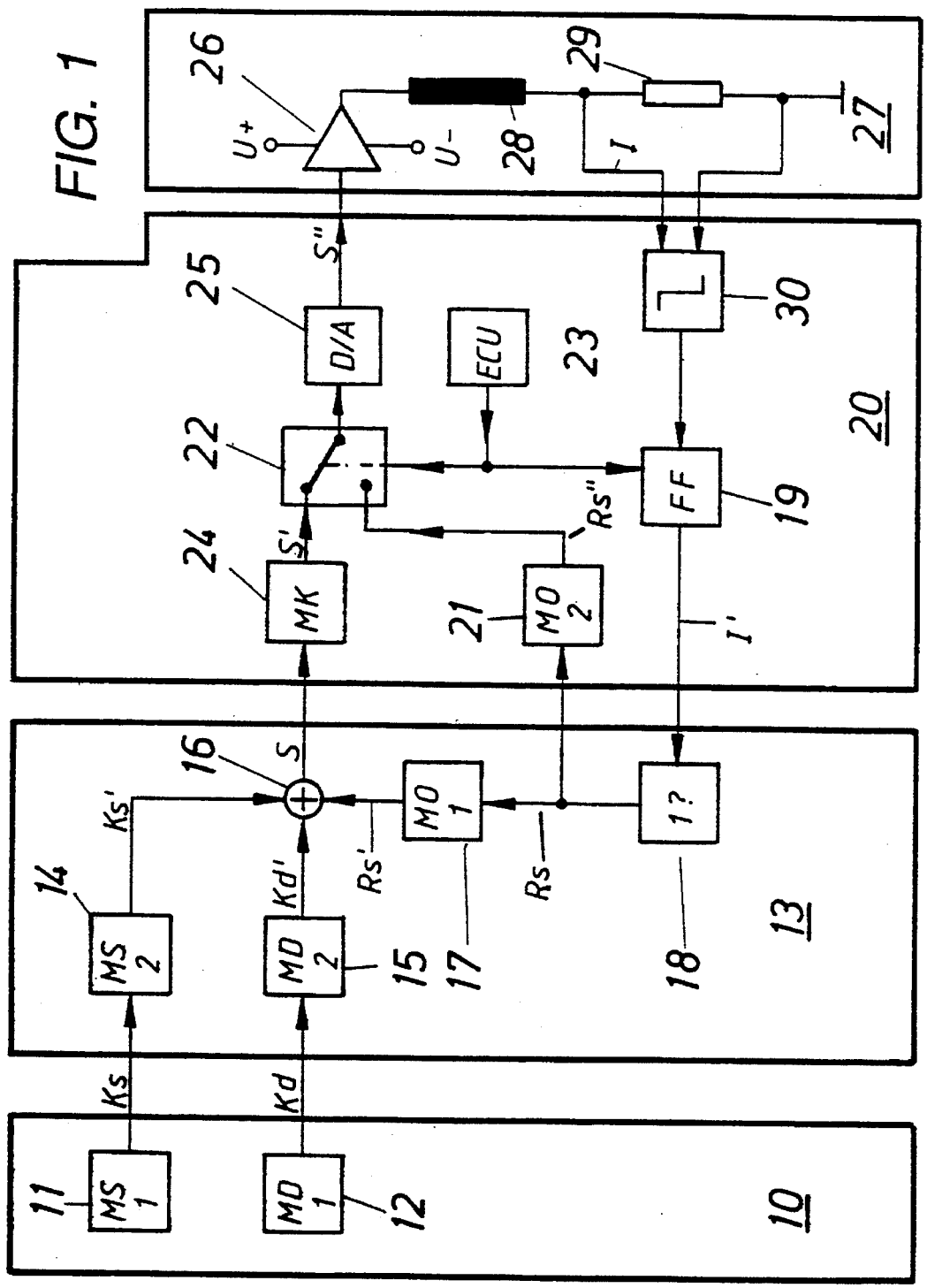

United States Patent [19]
Gleim

[11] Patent Number: 5,488,271
[45] Date of Patent: Jan. 30, 1996

[54] DEFLECTION REGULATING METHOD AND DEVICE

[75] Inventor: Günter Gleim, Villingen, Germany

[73] Assignee: Deutsche Thomson-Brandt GmbH, Villingen-Schwenningen, Germany

[21] Appl. No.: 422,741

[22] Filed: Apr. 14, 1995

Related U.S. Application Data

[63] Continuation of Ser. No. 55,108, May 3, 1993, abandoned.

[30] Foreign Application Priority Data

May 4, 1992 [DE] Germany ............... 42 14 317.9

[51] Int. Cl.⁶ ............... G09G 1/04; G09G 1/28; H04N 3/22
[52] U.S. Cl. ............ 315/370; 315/368.11; 315/387; 348/745; 348/806
[58] Field of Search ............ 315/368.11, 368.12, 315/387, 370, 371, 389, 367, 411; 348/806, 807, 177, 745–746

[56] References Cited

U.S. PATENT DOCUMENTS

| | | | |
|---|---|---|---|
| 3,996,611 | 12/1976 | Toone ............... | 315/368.11 |
| 4,754,204 | 6/1988 | Ando ............... | 315/367 |
| 4,870,329 | 9/1989 | Ara ............... | 315/367 |
| 4,935,674 | 6/1990 | Rodriguez-Cavazos ... | 315/368 |
| 4,956,586 | 9/1990 | Gipson et al. ....... | 315/387 |
| 4,990,834 | 2/1991 | Van Dalfsen ........ | 315/411 |
| 5,010,280 | 4/1991 | Ogino et al. ........ | 315/388 |
| 5,016,095 | 5/1991 | Kii ............... | 358/64 |
| 5,107,190 | 4/1992 | Schultz et al. ...... | 315/387 |
| 5,283,504 | 2/1994 | Chauvin et al. ..... | 315/370 |

*Primary Examiner*—Gregory C. Issing
*Attorney, Agent, or Firm*—Joseph S. Tripoli; Joseph J. Laks; Francis A. Davenport

[57] ABSTRACT

A method of regulating an operational parameter of an electrical apparatus includes the steps of obtaining a signal representative of a measured value of an effect on an adjustment device of the apparatus. The measured value is compared to a desired value to provide a regulating signal during a regulating mode. A static correction value and a dynamic correction value are superimposed onto the regulating signal to generate an actuation signal. The adjustment device is adjusted with the actuation signal during an operating mode.

20 Claims, 4 Drawing Sheets

DEFLECTION REGULATING METHOD AND DEVICE

This is a continuation of application Ser. No. 08/055,108, filed May 3, 1993 now abandoned.

This invention is directed to regulating method and device and is particularily useful in correcting deflection errors in color television tubes.

Regulating systems which determine manipulated variables on the basis of measured actual values and predetermined desired (target) values are generally known. Specific applications for regulating systems are also known, for example, for a so-called convergence correction.

Thus, for example, a projection television device is presented in DE-OS 39 36 789 in which a resistor is provided wired in series with deflection coils, whereby a voltage Ua drops (ensues) at said resistor and the value of said voltage depends on a deflection current ia. The voltage Ua is compared with a predetermined value and, depending on this comparison, manipulated variables are determined which influence the deflection current ia.

Furthermore, DE-OS 39 34 421 is known in which a circuit for screen correction in a television device is presented. This circuit causes a voltage, which can be picked up at a resistor wired in series with a deflection coil, to be compared with a reference voltage and, thereupon, trigger signals for the deflection coil to be corrected if necessary. In doing this, the distinction is made between a dynamic correction for a multiplicity of dots in a television image, and a static correction for stabilizing an offset position.

However, the convergence correction systems known from the state of the art do not permit both a correction of optical as well as of electrical deviations with just one regulation loop.

It is an object of the present invention to realize a regulation which renders possible a correction of various disturbances and has a low memory requirement.

According to the invention, firstly an actual value, which is a measure for the effect of a means of adjustment (actuator), is detected and, thereupon, a regulating actuating (adjusting) signal is determined through comparison with a predetermined target value in a regulating mode.

In addition, certain correction signals, which serve for correcting disturbances not covered by the regulating process, are superimposed upon, or combined with the regulating actuating signal beforehand. These correction signals may cover, for example, the influences from faulty mechanical adjustments or optical deviations in individual kinescopes when using the invention-type regulation in the case of convergence correction. Furthermore, picture distortions, such as pincushion distortions, can be corrected by the correction signals having predetermined waveform shapes. In order to avoid having to store correction values for every single picture dot (pixel), interpolation techniques can also be used. The way in which such correction signals are determined is known and this aspect will not be pursued further in this document.

By superimposing the regulating actuating signal upon the correction signals, a so-called actuating signal is produced which is used in an operating mode for triggering the means of adjustment (actuator).

Although the invention is described essentially by means of the convergence correction, attention is drawn to the fact that it is not limited to this application.

Despite fine resolution requiring a small regulating range, in a further embodiment, additional signals are combined with the regulating signal. The additional signals have a value which depends on the entire range of the correction signals.

If it is possible to split up the prior determined correction signals into a first group which corrects static errors such as faulty mechanical or optical adjustments in a kinescope, and into a second group which corrects dynamic errors such as the pincushion distortion mentioned, then in the cases in which the regulating actuating signal corrects common corrections for all pixels, this actuating signal can at first be superimposed upon the correction signals provided for the static corrections. The signal generated from this (hereinafter also called the static actuating signal) is subsequently superimposed upon the dynamic manipulated variable, thereby obtaining the actuating signal.

This is based on the finding that a regulating device, in particular for convergence correction, contains a (standard) microprocessor which generates the regulating actuating signal, and a second (specific) component which, for example, temporarily stores correction values, triggers the switchover between regulating mode and operating mode, processes the actuating signals for triggering the means of adjustment, etc.. These two components are normally connected by means of a data line with limited capacity which, for example, can be arranged as a serial data line.

If the static correction signals have the regulating and actuating signal superimposed on them within the microprocessor, then, for one thing, the static actuating signal, which only comprises a relatively small amount of correction data, is fed via a data line to the second component. The dynamic manipulated variable can also be sent via this data line to the second component; said manipulated variable comprises quite a large amount of correction data but has constant values. This means that, in total, a smaller data flow is necessary between the two components if the regulating actuating signal is being superimposed upon the static manipulated variable already within the microprocessor.

If two or more controlling means (control systems) serve for triggering the means of adjustment, each of which comprising, for example, a digital-to-analog converter(s), amplifier(s), etc., then it should be taken into account that each of these units may be subjected to individual drift, for example, as a result of temperature changes or aging, and that the determination of regulating actuating signals, and hence actuating signals too, will be necessary for each of these units.

In order to achieve a reduction in the amount of memory required and the data line capacity necessary, a splitting-up for the individual controlling means can take place upon transmitting the actuating signals.

For one thing, an average value for the two individual regulating actuating signals can be formed in the microprocessor and sent on to the second component. This single average value, which alters in a similar manner to the value of one individual regulating actuating signal, can be superimposed upon the static actuating signal.

Secondly, the differences between the individual regulating actuating signals and the average value are formed and these differences are added to the dynamic correction signals and transmitted.

Figure 2:
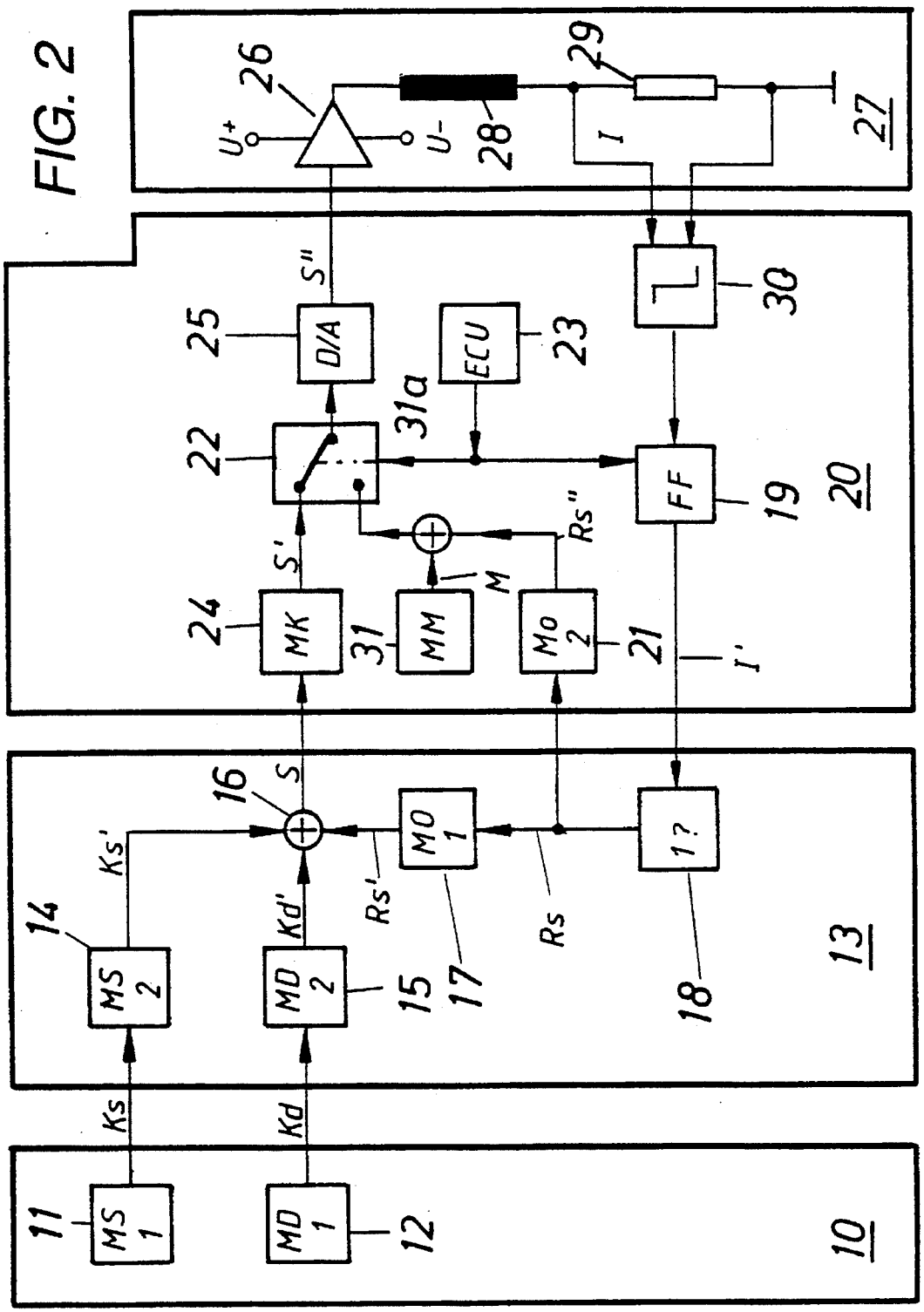
Figure 3:
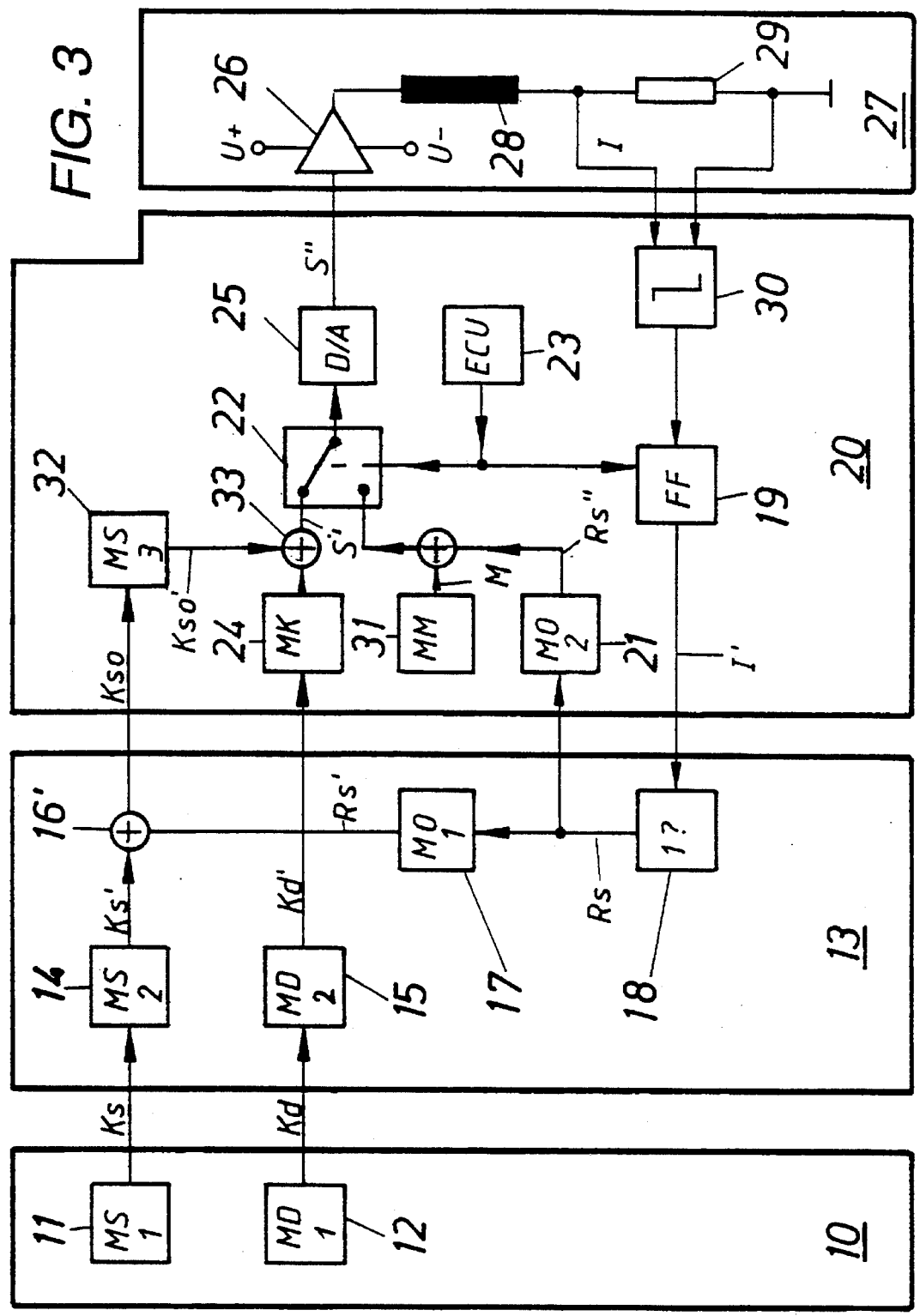
Figure 4:
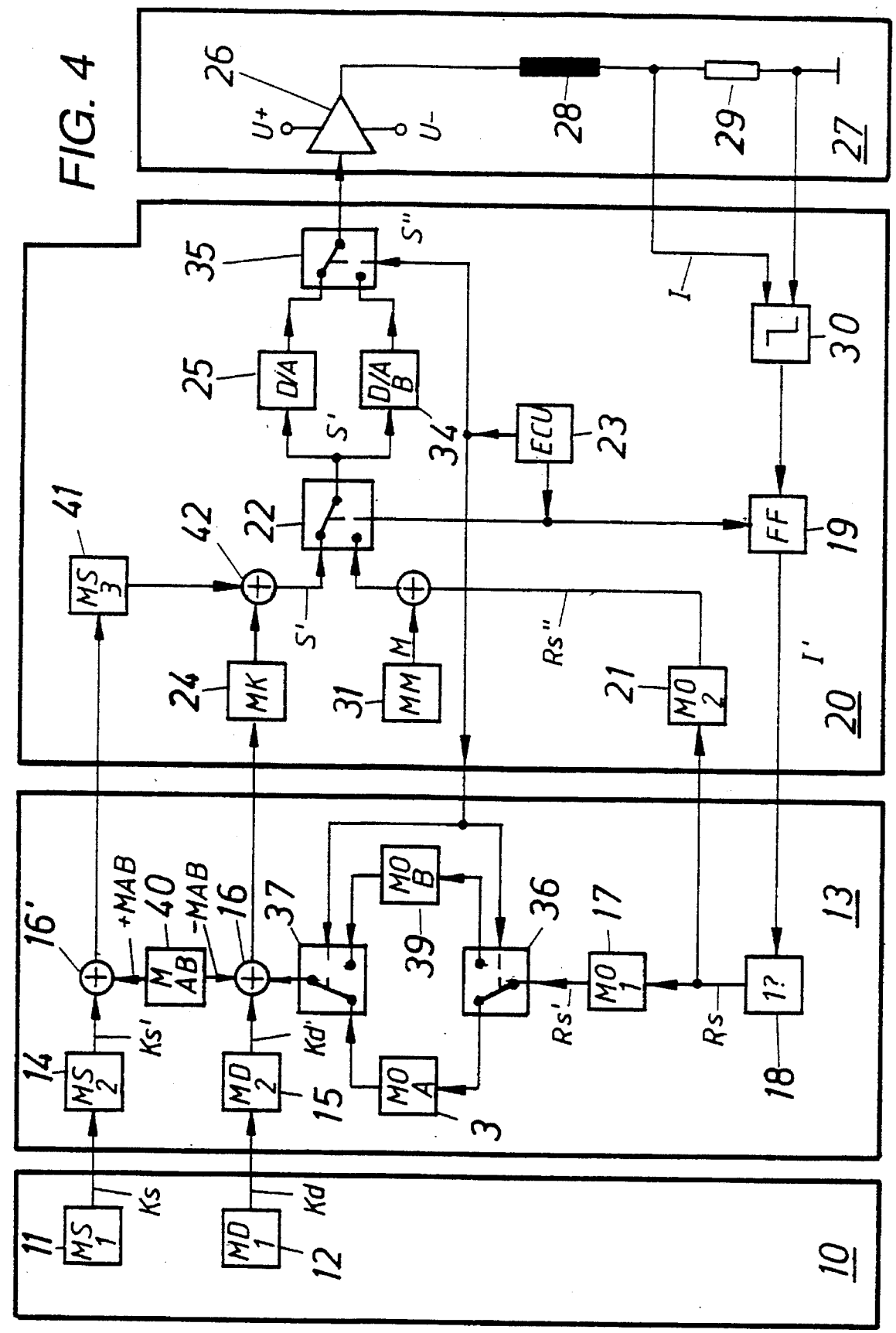

Other features, advantages and details of the invention are explained in the following embodiment examples by means of the drawing. The drawing shows:

FIGS. 1 through 3: various embodiment examples for convergence correction with a controlling means;

FIG. 4: a further embodiment example for convergence correction with two controlling means.

Before describing the embodiment examples in more detail, it should be pointed out that the blocks illustrated individually in the figures merely serge for the better understanding of the invention. Normally, individual or several of these blocks are combined into units. These can be realized in integrated or hybrid technology or as a program-controlled microcomputer or as a part of a program suitable for its control respectively.

However, the elements contained in the individual stages can also be arranged separately.

Several blocks are shown in FIG. 1 where a first block 10 represents a memory unit which has a first static correction memory (MS 1) 11 and a first dynamic correction memory (MD 1) 12 which may be designed, for example, as a so-called EEPROM. A further block 13 symbolizes a microprocessor component. This contains a second static memory (MS 2) 14 and a second dynamic memory (MD 2) 15, the input sides of which are connected to the corresponding first memories 11 and 12 respectively, and send out their output signals Ks and Kd respectively to a first superimposing stage 16. This is also fed with output signals Rs' from a first offset memory (MO 1) 17 which is fed with regulating actuating signals Rs from a comparison stage 18.

This comparison stage 18 receives its input signal I' from a flipflop 19 which is part of a block 20, referred to as special stage. Furthermore, this contains a second offset memory (MO 2) 21 which receives its data, likewise corresponding to the regulating actuating signals Rs, from the comparison stage 18 by means of a serial data line linking blocks 13 and 20, and transmits a signal Rs" on to a first switching terminal of a switch 22. This and the flipflop 19 are triggered by an electronic control unit (ECU) 23. The second switching input of the switch 22 is connected to the output of a correction memory (MK) 24, the input signal for which originates from the first superimposing stage 16. The connection between the superimposing stage 16, part of microprocessor 13, and the correction memory 24, part of block 20, is realized by means of a serial data line.

The switching output of the switch 22 leads to a digital-to-analog converter 25, the output signal of which is sent on to an amplifier 26, part of a block 27 which can be considered here as the outer wiring (protective circuit) of the specific stage. The output of amplifier 26 is connected to a deflector coil 28 which, in this embodiment example, serves as means of adjustment and is wired in series with a resistor 29 which is connected to ground. Both terminals of this resistor 29 lead to a threshold value stage 30, part of specific stage 20.

The function of the embodiment example according to FIG. 1 is described in the following.

Correction values are stored in the first static memory 11 and in the first dynamic memory 12; said correction values were determined beforehand within the scope of a production and balancing (alignment) process and transmitted further as correction signals Ks or Kd respectively. In doing this, the variables Ks of memory 11 essentially take into acount the optical and mechanical deviations of a kinescope, not illustrated here, which is allocated to the deflection coil 28. The correction values contained in the first dynamic memory 12 essentially take into acount the picture distortions, such as the so-called pincushion distortion, which can be different for each point of an image to be presented.

In FIG. 1, at switch on the correction values Ks, Kd of memories 11, 12 are first read into the second memories 14, 15 and combined with each other via the first superimposing stage 16. The values combined in this manner are fed to the correction memory 24 as actuating signal S. In an operating mode the switch 22 is switched in such a way that the vales S contained in memory 24 are fed via the digital-to-analog converter 25 and the amplifier 26 to the corrector coil 28.

During image blanking, for example during the vertical blanking interval, the control system is switched to a regulating mode by switch 22. Switch 22 is triggered, controlled by the electronic control unit 23, in such a manner that the output of the second offset memory 21 is connected to the input of the digital-to-analog converter 25. Consequently, at these times only the correction values of the second offset memory 21 are effective.

The flipflop 19 is also triggered by the electronic control unit 23 so that actual values I, measurable via resistor 29, are evaluated by the threshold value stage 30 and the corresponding output signal stored in the flipflop 19.

The switch 22 is switched back into the position shown in FIG. 1 after the conclusion of the regulating mode and at the start of the next operating mode, and the flipflop 19 is triggered in such a way that no further output signals from the threshold value stage 30 are stored.

The output signal I' of flipflop 19, which can assume either the status "zero" or the status "one", is evaluated by the comparison stage 18. If in this embodiment example the status of this output signal equals zero, a counter integrated into stage 18 is incremented by one, otherwise it is decremented. The corresponding output signal (regulating actuating signal) Rs is transmitted to both the first offset memory 17 and the second offset memory 21, and is utilized in the operating mode and in the regulating mode.

FIG. 2 shows a second embodiment example in which the voltage excursion (level) at the output of amplifier 26b can assume positive and negative values. Means and signal progressions which have the same function as in the embodiment example of FIG. 1 are given the same designations as in FIG. 1, and these will only be mentioned insofar as is necessary for understanding the invention.

The essential difference with respect to the embodiment example of FIG. 1 lies in the fact that an additional average value memory (MM) 31 is provided in which the following value is stored:

$$\tfrac{1}{2} * (\text{Max (MK)} - \text{Max (MO)});$$

where

Max (MK) is the maximum correction value which, according to experience, can be stored in memory 24; and Max (MO) is the maximum correction value which, according to experience, can be stored in offset memory 21.

The determination of a value according to the above formula has the advantage that, for one thing, only positive offset values (0 . . . Max (MO)) are contained in memory 21. The neutral value is then ½ * Max (MO). This is an advantage, particularly when using counters for determining the offset.

As a further possibility, it is also possible to store a value in memory 31 which value corresponds to $$\tfrac{1}{2} * \text{Max (MK)}.$$

In this case the range of values of the offset value stored in memory 21 extends over both positive and negative values (−Max'(MO) . . . +Max'(MO)). The neutral value then lies at zero.

Important with the value of the memory 31 is merely that the correction values stored in memory 21 are shifted into the vicinity of the neutral point, for which no offset correction is necessary. This means that the range of values to be provided in memory 21 can be reduced.

The output of memory 31 is connected via a second superimposing stage 31a to the first switching terminal of the switch 22.

This has the effect that offset values are read into the memories 17, 21, the range of values of which is smaller than for the preceding embodiment example. Hence, the memory capacity for the offset memory 17 is reduced while maintaining the same resolution.

Another example is illustrated in FIG. 3. Here too, means and signals already described will only be explained insofar as it appears necessary.

The essential difference with respect to the embodiment example of FIG. 2 is that here the output of the second dynamic memory 15 is connected directly to the input of the correction memory 24. The output of a superimposing stage 16' is connected to a third static memory (MS 3) 32, the output of which leads to a third superimposing stage 33. This is connected with a further input to the output of the correction memory 24 and sends its output signal to the second switching terminal of the switch 22.

The function of the embodiment example according to FIG. 3 has the effect that the offset correction values and the static correction values are combined with each other within the microprocessor 13 and fed to the specific stage 20. The dynamic correction values of the memory 15 are fed to the correction memory 24. Hence, if drift takes place, an overall markedly reduced data flow can be achieved.

A further embodiment example is shown in FIG. 4 in which the deflection coil 28 is triggered by two different controlling means which are formed by the above-mentioned digital-to-analog converter 25 (controlling means A) and a further digital-to-analog converter 34 (controlling means B).

These are selected alternatively by a means (systems) change-over switch 35 which is also triggered by the electronic control unit 23. Two further change-over switches 36, 37 are also triggered by means of the same signal, whereupon storing or reading-out respectively of the offset values belonging to the individual system is effected.

If system A is to be adjusted in the regulating mode, then switches 35, 36, 37 assume the position shown in FIG. 4. The offset values determined thereby are read into the second offset memory 21 and into an A-offset memory (MO A) 39a.

If system B of the digital-to-analog converter 34 is to be adjusted, then switches 35, 36, 37 assume a position opposite to that shown in FIG. 4 and the corresponding offset values are stored in the second offset memory 21 and the B-offset memory (MO B) 39b. The average value of the offset value of system A and system B, i.e.

½ ( offset (A)+offset (B)), is stored in an AB-memory (M AB) 40 which is disposed between the connection point (junction) 16 and the junction 16'. Offset (A) and offset (B) are determined depending on the value stored in memory 31, as already described above.

This average value is given as additive for junction 16' and subtractive for junction 16.

Thus, merely the dynamic manipulated variable and the difference values of the individual offset values A, B to the average value are transferred via the data line which is connected with junction 16.

In contrast, the static actuating signal and the average value mentioned are transmitted from junction 16' and transferred into a third static memory (MS 3) 41, part of the specific component 20. The values read out from this and the values read out from the correction memory 24 are superimposed on each other in a further combining stage 42 and fed to one of the controlling means A, B according to the position of the switch 22.

I claim:

1. A method of deflection current regulation in a deflection amplifier coupled to a deflection coil, comprising the steps of:

(a) measuring a deflection current value during a first mode of operation;

(b) comparing said measured value with a predetermined value to produce a first correction signal;

(c) applying said first correction signal to said deflection amplifier to provide corrective regulation during said first mode of operation;

(d) combining a predetermined correction signal, comprising a static error correction component and a dynamic error correction component with said first correction signal to produce a second correction signal; and, (e) applying said second correction signal to said deflection amplifier to provide corrective regulation during a second mode of operation.

2. The method of claim 1, wherein said first mode of operation occurs in a first time period.

3. The method of claim 2, wherein said first time period corresponds to an image display blanking interval.

4. The method of claim 1, wherein said second mode of operation occurs in a second time period.

5. The method of claim 4, wherein said second time period corresponds to an image display interval.

6. The method of claim 1, wherein said first mode of operation and said second mode of operation are contiguous.

7. The method of claim 1, wherein said static error correction component is generated responsive to a stored value.

8. The method of claim 1, wherein said dynamic error correction component is generated responsive to a stored value.

9. The method of claim 3, wherein said image display blanking interval corresponds to a vertical blanking interval.

10. The method of claim 1 wherein step (d) further comprises a step of selecting between said first correction signal in said first mode of operation and said second correction signal in said second mode of operation.

11. A deflection apparatus having deflection current regulation comprising:

a deflection coil;

a deflection amplifier coupled to said coil for generating a current therein;

means for measuring said current;

means for comparing said measured current with a desired value and generating a first control signal responsive to said comparison for coupling to control said deflection amplifier during a first mode; and, means for combining said first control signal with a predetermined correction signal comprising a static error correction component and a dynamic error correction component to produce a second control signal for coupling to control said deflection amplifier during a second operating mode.

12. The deflection apparatus of claim 11 wherein said first mode is a regulating mode.

13. The deflection apparatus of claims 12, wherein said regulating mode occurs in a first time period.

14. The deflection apparatus of claim 13, wherein said first time period corresponds to a vertical blanking interval.

15. The deflection apparatus of claim 11, wherein said second mode is an operating mode which occurs in a time period corresponding to an image display interval.

16. The deflection apparatus of claim 11, wherein said first mode and said second mode are alternate.

17. The deflection apparatus of claim 11, wherein said static error correction component is generated responsive to a stored value.

18. The deflection apparatus of claim 11, wherein said dynamic error correction component is generated responsive to a stored value.

19. The deflection apparatus of claim 11, further comprising a switching means for selecting said first control signal during said first mode and said second control signal during said second mode.

20. The deflection apparatus of claim 19, further comprising means for generating a switch control signal for initiating one of said modes.

* * * * *